US 6,579,447 B2

(12) United States Patent
Romanyszyn et al.

(10) Patent No.: US 6,579,447 B2
(45) Date of Patent: Jun. 17, 2003

(54) SELF-CLEANING PRE-FILTER SYSTEM

(75) Inventors: Michael T. Romanyszyn, San Antonio, TX (US); Robert S. Bosko, San Antonio, TX (US)

(73) Assignee: Lancer Partnership, Ltd., San Antonio, TX (US)

( * ) Notice: Subject to any disclaimer, the term of this patent is extended or adjusted under 35 U.S.C. 154(b) by 0 days.

(21) Appl. No.: 09/912,868

(22) Filed: Jul. 25, 2001

(65) Prior Publication Data

US 2003/0019800 A1 Jan. 30, 2003

(51) Int. Cl.$^7$ ............................................... B01D 29/66
(52) U.S. Cl. .................. 210/108; 210/90; 210/143; 210/202; 210/209; 210/134; 210/257.2; 210/411
(58) Field of Search .................. 210/90, 108, 143, 210/201, 202, 206, 257.2, 259, 411, 502.1, 321.66, 134, 209, 427, 97

(56) References Cited

U.S. PATENT DOCUMENTS

| 5,151,175 | A | * | 9/1992 | Royal |
| 5,244,579 | A | * | 9/1993 | Horner et al. |
| 5,490,924 | A | * | 2/1996 | Macia et al. |
| 5,667,670 | A | * | 9/1997 | Drewery |
| 6,290,856 | B1 | * | 9/2001 | Beall |

* cited by examiner

Primary Examiner—Joseph Drodge
Assistant Examiner—Terry K. Cecil
(74) Attorney, Agent, or Firm—Christopher L. Makay

(57) ABSTRACT

A self-cleaning prefilter system generally includes a system inlet 11, a sediment filter 13 having a selectively openable drain port 18, a chemical injector 21, a pressure accumulator 28 having a upper chamber 31 in open fluid communication with the filter outlet 16, and a system outlet 12. A controller 33 in communication with a plurality of valves (V1, V2, V3) initiates a backwashing mode such that upon opening of the drain valve V3, fluid within the upper chamber 31 of the pressure accumulator is driven back towards the sediment filter to backwash the filter screen thereof. Contemporaneously, chemicals within the chemical injector 21 are driven along with the backwash flow via capillary 24.

18 Claims, 5 Drawing Sheets

SELF-CLEANING PRE-FILTER SYSTEM

FIELD OF THE INVENTION

The present invention relates to liquid filtration. More particularly, the invention relates to a water pre-filter that utilized stored pressure to periodically back flush a sediment filter, removing any cleared detritus from the system through a drain port.

BACKGROUND OF THE INVENTION

Water filtration often involves the use of multiple pre-filtration steps in order to remove sediment of gradually decreasing size. In practice, a large screen filter is first used to remove large objects from the water followed by filtration with screens of gradually decreasing mesh size. While it would be desirable to remove all of the sediment with a single filtering operation, use of a filter with small enough mesh size to clear the water in an initial step leads to rapid clogging of the filter screen by larger particles. As a result, water users have been forced to implement very expensive pre-filter systems in order to ensure uninterrupted water sources. It is therefore an overriding object of the present invention to provide a water pre-filter system wherein a fine mesh filter may be utilized in an initial filtering stage without the problems of clogging that have plagued previous designs.

SUMMARY OF THE INVENTION

In accordance with the foregoing objects, the present invention—a self-cleaning pre-filter system—generally comprises a system inlet; a sediment filter having a filter inlet in selective fluid communication with the system inlet, a selectively openable drain port and a filter outlet, separated from the filter inlet and the drain port by a filter screen; a pressure accumulator having a first chamber in open fluid communication with the filter outlet and having a sealed second chamber containing a compressible medium, the first chamber and the second chamber being separated one from the other by a flexible diaphragm; and a system outlet in selective fluid communication with the filter outlet and the first chamber.

In order to provide the desired selective fluid communications and the selective state of the drain port, the preferred embodiment of the present invention comprises an inlet valve between the system inlet and the filter inlet; a drain valve in the drain port; and an outlet valve between the first chamber and the system outlet. Preferably, each valve comprises a solenoid operated flow control valve, which may each be controlled by a provided system controller. In order to ensure maximum operational efficiency, the drain valve is also preferably a high capacity flow control valve relative to the inlet valve and the outlet valve. While the controller may comprise a dedicated state machine or micro-controller, those of ordinary skill in the art will recognize that the control function may also be integrated within the controller of a related device.

In operation, the controller operates the valves to periodically back flush the sediment filter utilizing energy stored in the pressure accumulator. Any detritus removed from the filter screen during the back flush process is immediately discharged from the system through the drain port. The controller then returns to the filter system to normal operation.

Finally, many other features, objects and advantages of the present invention will be apparent to those of ordinary skill in the relevant arts, especially in light of the foregoing discussions and the following drawings, exemplary detailed description and appended claims.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein.

DETAILED DESCRIPTION OF THE PREFERRED EMBODIMENT

Although those of ordinary skill in the art will readily recognize many alternative embodiments, especially in light of the illustrations provided herein, this detailed description is exemplary of the preferred embodiment of the present invention, the scope of which is limited only by the claims appended hereto.

Figure 1:
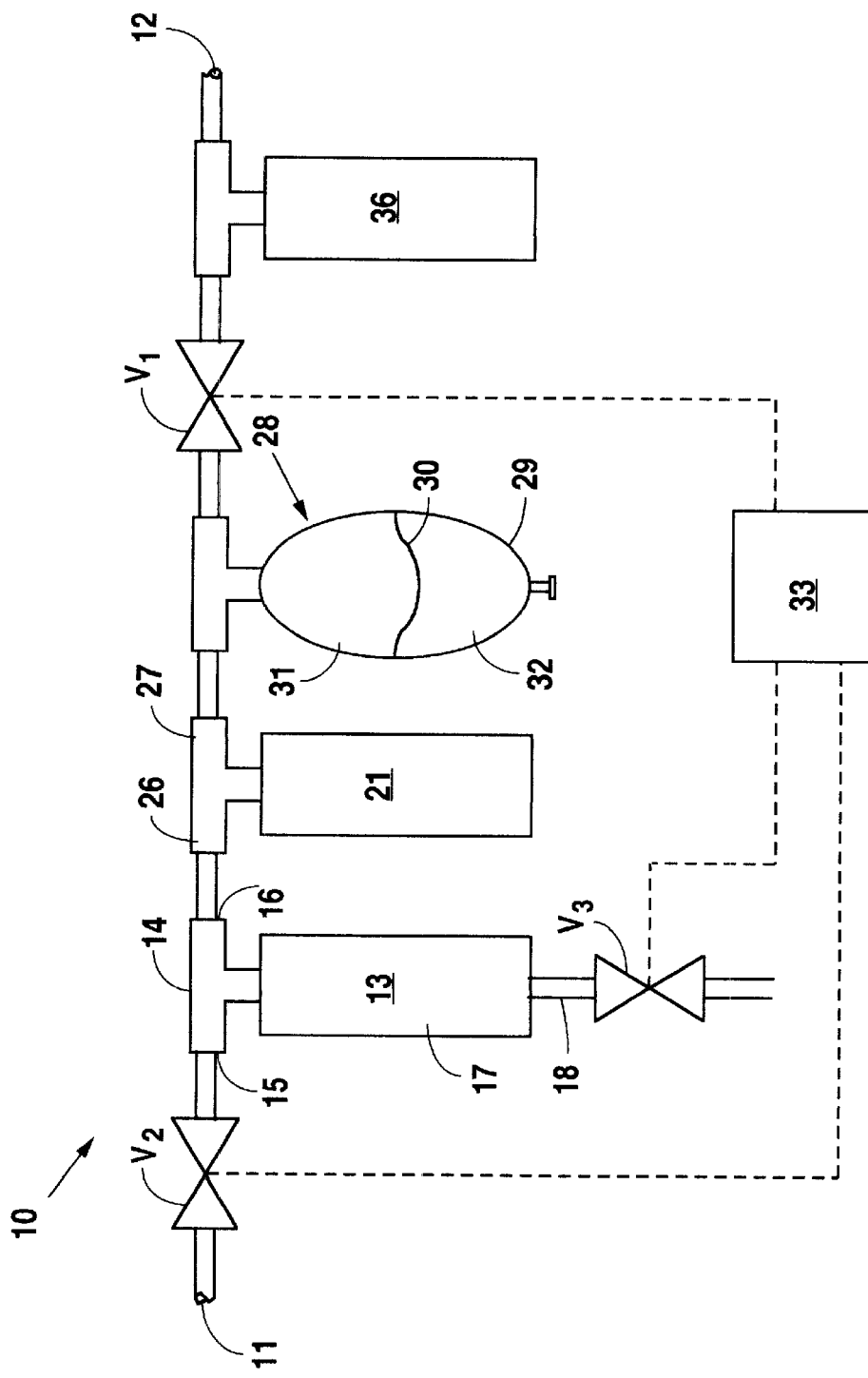
FIG. 1 shows, in schematic block diagram, a first preferred embodiment of the self-cleaning pre-filter system of the present invention.

Referring now to FIG. 1, the self-cleaning pre-filter system 10 of the present invention is shown to generally comprise a sediment filter 13, a pressure accumulator 28 and a plurality of solenoid actuated flow control valves $V_1$, $V_2$ and $V_3$ arranged in the fluid flow between a system inlet 11 and system outlet 12. In operation, the solenoid actuated flow control valves $V_1$, $V_2$ and $V_3$ are utilized to periodically interrupt normal fluid flow from the system inlet 11 to the system outlet 12 for backflush cleaning of the sediment filter 13. As will be better understood further herein, the pressure accumulator 28 provides the necessary energy for creating a reverse fluid flow through the sediment filter 13 thereby removing therefrom any detritus lodged therein.

Figure 2:
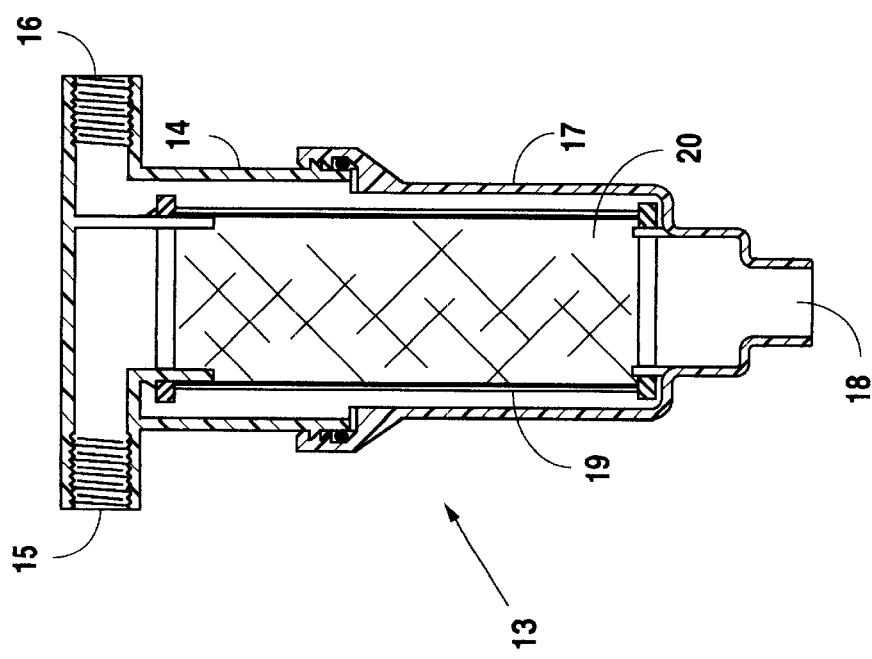
FIG. 2 shows, in a cross-sectional front elevational view, a sediment filter as appropriate for use in implementation of the filter system of FIG. 1.

As particularly shown in FIG. 2, the sediment filter 13 as appropriate for use in implementation of the present invention generally comprises a cylindrical filter cartridge 19 dependently interposed a filter top 14 and filter bowl 17. During normal usage, fluids enter the sediment filter 13 through an inlet 15 on the filter top 14 and are directed to the interior of the cylindrical filter cartridge 19. The cylindrical filter cartridge 19, which comprises a caged, wire mesh filter screen 20, prevents the passage of detritus as the fluids flowing through the sediment filter 13 are forced through the cartridge's wall and out of an outlet 16 into the filter top 14. A drain port 18 is provided in the base of the filter bowl 17 in fluid communication with the interior of the cylindrical filter cartridge 19. Although those of ordinary skill in the art will recognize many substantial equivalents for implementation of the principles of the present invention, applicant has found that the in-line strainer commercially available from Ron-Vik, Inc. of Minneapolis Minn. is suitable for implementation of the present invention.

As particularly shown in FIG. 1, the pressure accumulator 28 generally comprises a pressure vessel 29 with an upper chamber 31 and a compressible medium 32 separated by an internal diaphragm 30. The model 181-201 pre-pressurized accumulator tank commercially available from ShurFlo Pump Mfg. Co. of Santa Ana, Calif. is exemplary of such a pressure accumulator 28. In operation, normal flow results in some fluid entering the upper chamber 31 of the pressure vessel 29. This entry causes deflection of the diaphragm 30 and compression of the compressible medium 32. Upon interruption of normal flow, the compressible medium expands against the diaphragm 30, thereby forcing the entered fluid from the upper chamber 31 of the pressure vessel 29. In this manner, as will be better understood further herein, fluid flow may be reversed through the sediment filter 13 for cleaning of the cylindrical filter cartridge 19 housed therein.

In an alternative embodiment, the pressure accumulator 28 as previously described may be dispensed with in favor of a system wherein incoming water pressure is utilized to drive a volume of stored filtered water back through the filter cartridge 19. The additional plumbing and valves for implementation of this alternative are well within the ordinary skill in the art, especially in light of this present exemplary disclosure. As will be apparent to those of ordinary skill in the art, it is only necessary that some provision be made for the backward flow across the filter cartridge 19 of clean, filtered water.

As will be better understood further herein, fluid flow through the self-cleaning pre-filter system 10 of the present invention normally comprises entry through the system inlet 11, passage through the sediment filter 13 and exit through the system outlet 12. A normally open, solenoid controlled outlet valve $V_1$ is provided, however, downstream from the pressure accumulator 28 to disrupt flow from the system outlet 12. (Although the outlet valve $V_3$ is shown in the figures as a component of the pre-filter system 10, those of ordinary skill in the art will recognize that this valve $V_3$ may in fact comprise an inlet valve to a host equipment item.) Likewise, a normally open, solenoid controlled inlet valve $V_2$ is provided at the system inlet 11 in order to disrupt flow to the self-cleaning pre-filter system 10 as well as to isolate the pre-filter system 10 from its fluid source during cleaning of the sediment filter 13. Finally, a normally closed, solenoid controlled drain valve $V_3$ is provided in the drain port 18 of the filter bowl 17 for evacuation of detritus from the self-cleaning pre-filter system 10. Because, as will be better understood further herein, it is desirable to fully and completely open the drain port 18 with minimal fluid resistance it is important in implementation of the present invention that the solenoid controlled drain valve $V_3$ be of a large volume capacity. To this end, applicant has found that the series 1000 solenoid piloted one inch port electric control valve commercially available from Evolutionary Concepts, Inc. of San Dimas, Calif. under the trademark "ECI" is suitable for use in the present invention. As also will be better understood further herein, each solenoid actuated control valve $V_1$, $V_2$ and $V_3$ is in electrical communication with a controller 33. As will be readily appreciated by those of ordinary skill in the art, such a controller may comprise a simple state machine or may be microprocessor-based, as will depend upon the greater application with which the self-cleaning pre-filter system 10 of the present invention is utilized.

Figure 4:
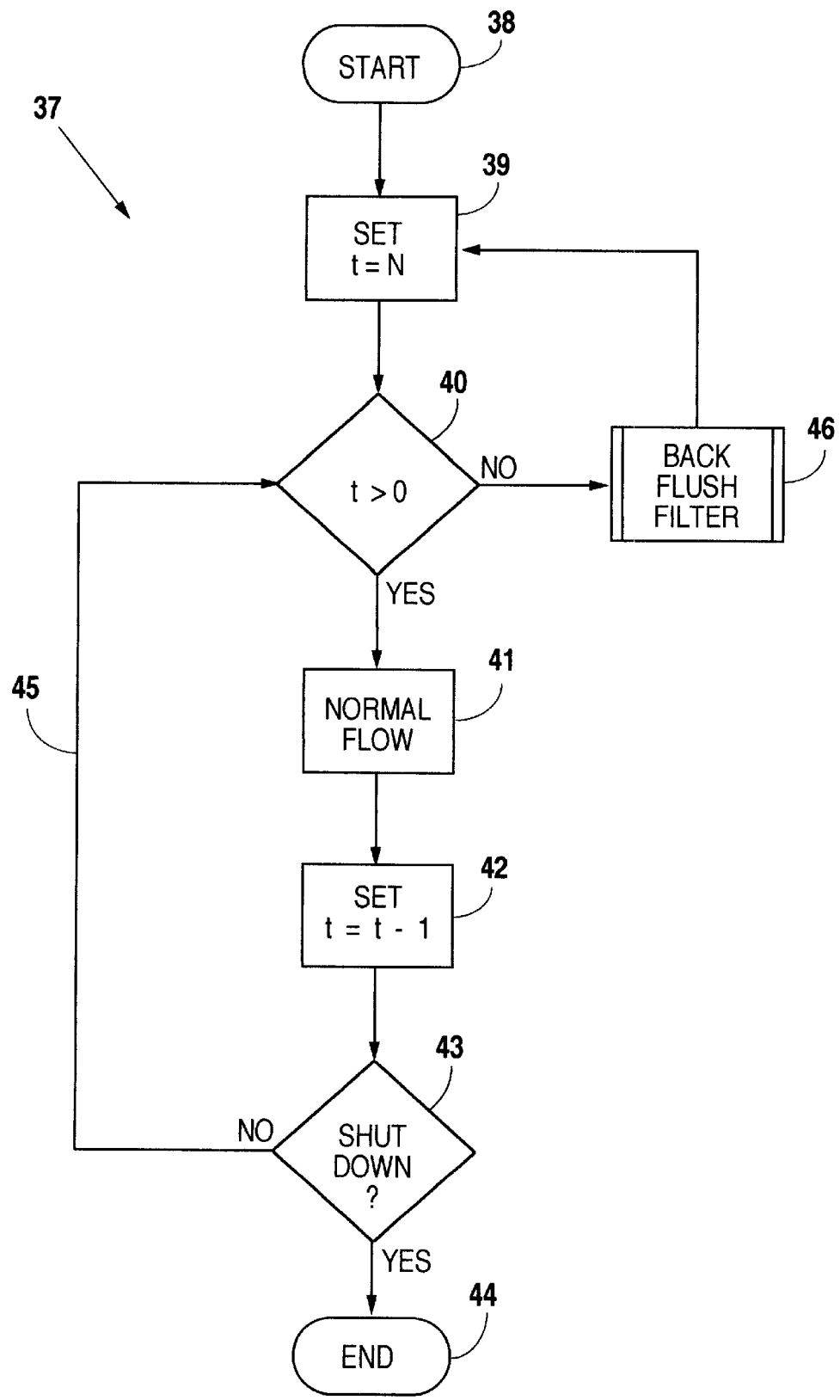
FIG. 4 shows, in flowchart, a first preferred method of operation of the filter system of FIG. 1.

Referring now to FIG. 4, a timer-based control scheme 37 for operation of the present invention is now detailed. Under such a timer-based control scheme 37, upon starting 38 of filtering operation a counter is set equal to a pre-determinable value 39. The controller 33 then determines whether the count value is greater than zero 40. If yes, normal flow as previously described, is maintained 41 and the counter value is decremented 42. If it is then determined that a system shut-down is desired 43, the system 10 is shut down 44 without having performed a filter cleaning. If, on the other hand, a system shut-down is determined to not be desired 43, the counter state is rechecked 45. If, upon checking the counter state it is determined that the counter has reached zero 40, a flushing sequence 46 is then performed.

Figure 5:
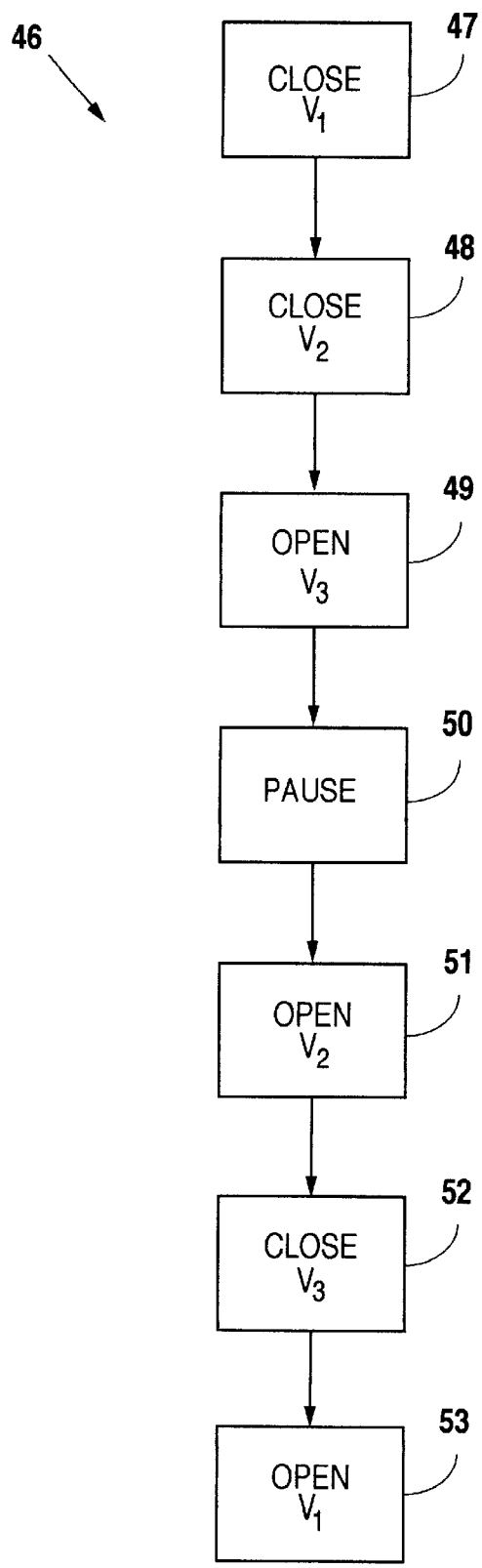
FIG. 5 shows, in flowchart, details of the filter back flushing step of the method of FIG. 4.

As detailed in FIG. 5, the flushing sequence 46 begins with the closing 47 of the solenoid controlled outlet valve $V_1$, thereby terminating fluid flow through the pre-filter system 10 at the pressure accumulator 28. The solenoid controlled inlet valve $V_2$ is then closed 48 in order to isolate the pre-filter system 10 from the source of fluid flow. The solenoid controlled drain valve $V_3$ is then opened 49, thereby allowing the reverse fluid flow from the pressure accumulator 28 to enter the outlet of the sediment filter 13. The reverse flow of fluid through the sediment filter 13 serves to dislodge any detritus from the filter screen 20. A pause 50 may be implemented at this stage to allow the dislodged detritus to evacuate through the drain port 18. Preferably, the solenoid controlled inlet valve $V_2$ is then opened 51 to further flush the dislodged detritus from the sediment filter 13. The solenoid controlled drain valve $V_3$ is then closed 52 and the solenoid controlled outlet valve $V_1$ is then opened 53 to resume normal flow.

Figure 3:
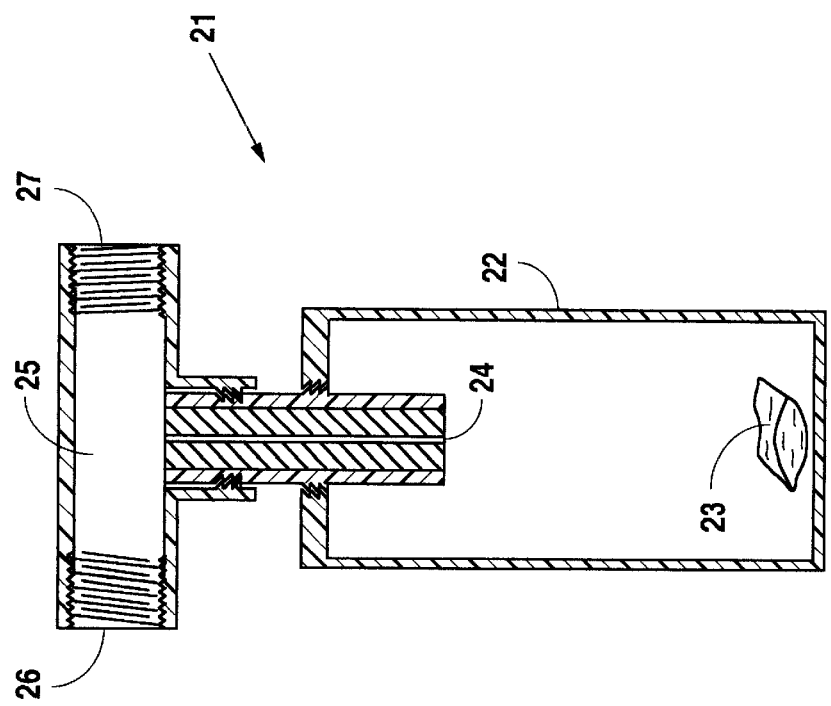
FIG. 3 shows, in a cross-sectional front elevational view, a chemical injector as appropriate for use in implementation of the filter system of FIG. 1.

As shown in FIGS. 1 and 3, a chemical injector 21 is preferably interposed in the fluid flow between the sediment filter 13 and the pressure accumulator 28. The chemical injector 21 generally comprises a chemical container 22 in communication with the fluid flow path 25 through a capillary 24. During normal flow from the inlet 26 to the outlet 27 of the chemical injector 21, pressure in the fluid flow path 25 squeezes a compressible pillow 23 within the chemical container 22. During periods of reduced pressure in the fluid flow path 25, such as during the pause 50 after opening 49 of the solenoid controlled drain valve $V_3$ for evacuation of the sediment filter 13, the compressible pillow 23 expands causing a small amount of chemical within the chemical container 22 to be forced through the capillary 24 and into the fluid flow path 25. In this manner, the chemical injector 21 may be utilized to automatically treat the fluid contemporaneously with the removal of detritus from the pre-filter system 10. Those of ordinary skill in the art will recognize other substantially equivalent implementations and will appreciate the relative merits of various treatment chemicals, such as, for example, chlorine, bromine, iodine or any surfactant biostat. In one exemplary implementation, Applicant has found it preferable to practice the present invention with the chlorinator module commercially available from Pure 1 Systems of New Rochelle, N.Y.

When using a chemical injector 21 as previously described, it may be desirable to take extra caution to ensure that only safe levels of the injected chemical remain in the fluid passing from the system outlet 12. This is especially important in implementations wherein the self-cleaning pre-filter system 10 of the present invention is used for the filtering of drinking water and the like. To this end, Applicant has found it desirable to include an in-line chemical filter between the solenoid controlled outlet valve $V_1$ and the system outlet 12. As known to those of ordinary skill in the art, such an in-line chemical filter 36 may comprise a granular activated carbon ("GAC") chlorine removal filter for cases where chlorine is injected by the chemical injector 21. Likewise iodine removal filters may be provided if the injected chemical is iodine, and so forth.

Figure 6:
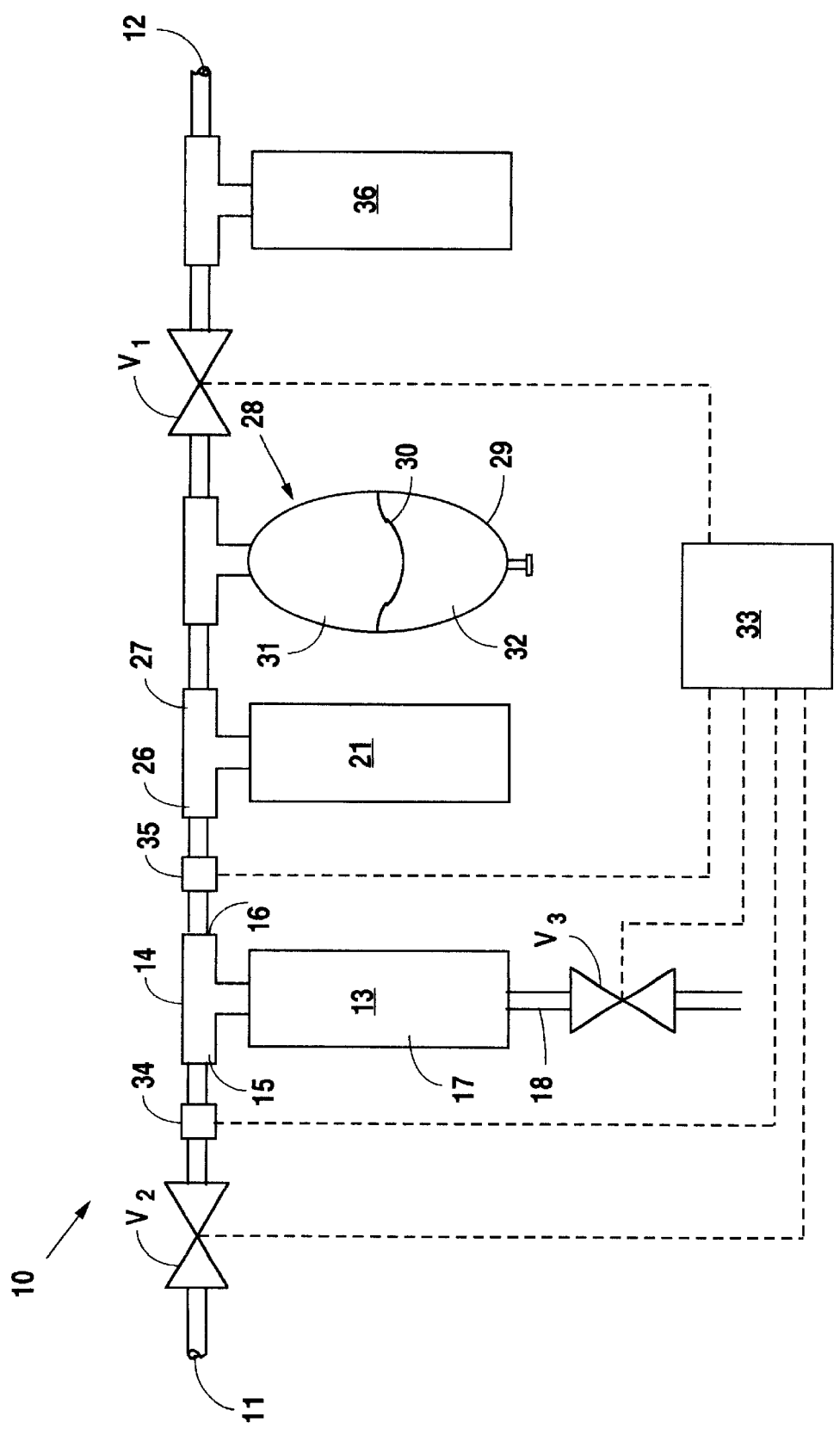
FIG. 6 shows, in schematic block diagram, a second preferred embodiment of the self-cleaning pre-filter system of the present invention.

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and claims drawn thereto. For example, in an alternate embodiment for the control of the present invention, an upstream pressure transducer 34 and a downstream pressure transducer 35, as particularly shown in FIG. 6, may be provided for detection through the controller 33 of an increased pressure differential across the sediment filter 13. As will be appreciated by those of ordinary skill in the art, such an increased pressure differential would indicate the build up of detritus within the cylindrical filter cartridge 19 of the sediment filter 13. Detection of the differential may then be utilized as a triggering signal for the initiation of the flushing sequence 46. In this manner, flushing of the sediment filter 13 may be performed as often as necessary but without waste of power, as may be important for remote, battery-operated implementations.

Additionally, those of ordinary skill in the art will recognize that a flow meter may be implemented, whereby the flushing sequence 46 is triggered upon a predetermined amount of water having passed through the pre-filter system 10. Likewise, those of ordinary skill in the art will recognize that in a minimal configuration the pre-filter system 10 may be implemented with no controller whatsoever, in which case the valves $V_1$, $V_2$ and $V_3$ may be operated strictly manually. Finally, in implementations wherein the outlet valve V3 is or doubles as an inlet valve to a host equipment item, the flushing sequence may be initiated (1) on demand, just prior to delivery of filtered water to a host machine, (2) during periods where demand is absent, or (3) upon any combination of demand-based cues and/or the methods previously described. Likewise, the flushing sequence may be initiated under the control of the host equipment item's internal controller. In any case, because the scope of the present invention is much broader than any particular embodiment, the foregoing detailed description should not be construed as a limitation of the scope of the present invention, which is limited only by the claims appended hereto.

What is claimed is:

1. A self-cleaning pre-filter system, said system comprising:
    a system inlet;
    a sediment filter having a filter inlet in selective fluid communication with said system inlet, a selectively openable drain port and a filter outlet, said filter inlet and said drain port being separated from said filter outlet by a filter screen;
    a pressure accumulator having a first chamber in open fluid communication with said filter outlet and having a sealed second chamber containing a compressible medium, said first chamber and said second chamber being separated one from the other by a flexible diaphragm;
    a system outlet in selective fluid communication with said filter outlet and said first chamber; and
    a chemical injector between said filter outlet and said first chamber, whereby the interruption of fluid communication from the system inlet and to the system outlet and the opening of said drain port facilitates fluid communication from said first chamber back through said filter screen and to said drain port, and further whereby the chemical injector delivers chemical back through said filter screen and to said drain port during fluid communication from said first chamber back through said filter screen.

2. The system as recited in claim 1, said system further comprising:
    an inlet valve between said system inlet and said filter inlet;
    a drain valve in said drain port; and
    an outlet valve between said first chamber and said system outlet.

3. The system as recited in claim 2, wherein said inlet valve, said drain valve and said outlet valve each comprise a solenoid operated flow control valve.

4. The system as recited in claim 3, wherein said drain valve comprises a high capacity flow control valve relative to said inlet valve and said outlet valve.

5. The system as recited in claim 3, said system further comprising a controller adapted to control said inlet valve, said drain valve and said outlet valve.

6. The system as recited in claim 5, wherein:
    said inlet valve and said outlet valve comprises normally open valves and said drain valve comprises a normally closed valve; and
    said controller is adapted to selectively close said inlet valve and said outlet valve and to selectively open said drain valve.

7. The system as recited in claim 6, wherein said controller is adapted to effect a valve operating sequence comprising the steps of:
    first closing said outlet valve;
    second closing said inlet valve; and
    third opening said drain valve.

8. The system as recited in claim 7, wherein said controller is further adapted to effect a second valve operating sequence comprising the steps of:
    first opening said inlet valve;
    second closing said drain valve; and
    third opening said outlet valve.

9. The system as recited in claim 5, wherein said controller comprises a state machine.

10. The system as recited in claim 5, wherein said controller comprises a micro-controller.

11. The system as recited in claim 5, wherein said controller comprises a portion of an external machine.

12. The system as recited in claim 5, wherein said controller is adapted to periodically operate said valves for maintenance of said sediment filter.

13. The system as recited in claim 5, said system further comprising a first pressure transducer between said system inlet and said filter inlet and a second pressure transducer between said filter outlet and said system outlet, said first and second pressure transducers being in communication with said controller for the detection of diminished flow through said sediment filter.

14. The system as recited in claim 13, wherein said controller is adapted to effect operation of said valves for maintenance of said sediment filter in response to detection through said first and second pressure transducers of diminished flow through said sediment filter.

15. The system as recited in claim 1, wherein said chemical injector comprises a source of chlorine.

16. The system as recited in claim 1, wherein said chemical injector comprises a source of iodine.

17. The system as recited in claim 1, said system further comprising a chemical filter between said first chamber and said system outlet.

18. The system as recited in claim 17, wherein said chemical filter comprises a granular activated carbon filter.

* * * * *